United States Patent
Sodhi

(10) Patent No.: US 7,376,956 B2
(45) Date of Patent: May 20, 2008

(54) SYSTEM FOR PERFORMING MULTIPLE FUNCTIONS IN PARALLEL TIME

(75) Inventor: Ajit Sodhi, Irvine, CA (US)

(73) Assignee: Toshiba Tec Kabushiki Kaisha (JP)

( * ) Notice: Subject to any disclaimer, the term of this patent is extended or adjusted under 35 U.S.C. 154(b) by 1018 days.

(21) Appl. No.: 10/238,156

(22) Filed: Sep. 10, 2002

(65) Prior Publication Data

US 2004/0046983 A1    Mar. 11, 2004

(51) Int. Cl.
*G06F 9/46* (2006.01)
(52) U.S. Cl. ............................. 719/312; 710/7; 710/36; 710/51; 358/1.13; 358/1.15
(58) Field of Classification Search ................. 719/312; 710/7, 36, 260, 313, 8, 51; 358/1.13, 1.15; 709/213
See application file for complete search history.

(56) References Cited

U.S. PATENT DOCUMENTS 5,548,728 A * 8/1996 Danknick ................... 709/213
5,600,804 A * 2/1997 Ip .............................. 710/310
6,128,689 A * 10/2000 Hassbjer et al. ............ 710/305
6,980,319 B2 * 12/2005 Ohta .......................... 358/1.18

* cited by examiner

*Primary Examiner*—William Thomson
*Assistant Examiner*—Phuong N Hoang
(74) *Attorney, Agent, or Firm*—Tucker Ellis & West LLP

(57) ABSTRACT

A architecture for a multifunction peripheral to service a plurality of clients simultaneously. A shared memory receives data from the plurality of clients. A channel multiplexer selects data to be routed to a peripheral, a SCSI emulator is used to logically select the peripheral. The data is then forwarded from the multiplexer via the SCSI emulator to a PCI bus, the PCI bus being physically connected with the peripheral's engine. When data needs to be sent from a peripheral to a client, it is forwarded from the PCI bridge to the SCSI emulator and routed via a demultiplexer to the shared memory wherein it is retrieved by the appropriate client. The multifunction peripheral can be interrupted while performing a first task using a first peripheral, switch to a second task needing a second peripheral, and return to the first task when completed.

12 Claims, 2 Drawing Sheets

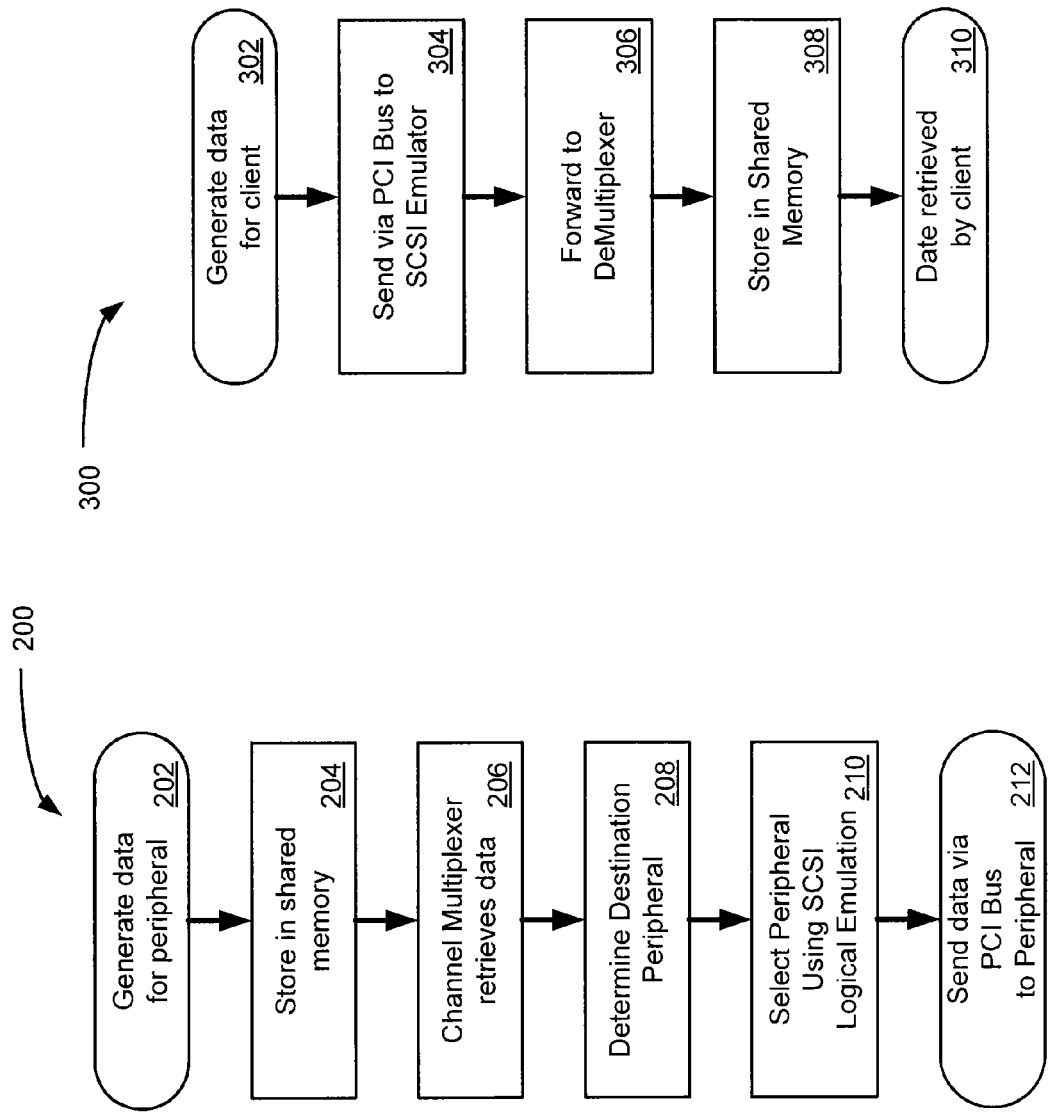

SYSTEM FOR PERFORMING MULTIPLE FUNCTIONS IN PARALLEL TIME

CROSS-REFERENCE TO RELATED APPLICATIONS

Not applicable.

STATEMENT REGARDING FEDERALLY SPONSORED RESEARCH OR DEVELOPMENT.

Not applicable.

REFERENCE TO A "MICROFICHE APPENDIX."

Not applicable.

BACKGROUND OF THE INVENTION

The present invention relates generally to a multifunction information processing system, and more particularly, to a multifunction information processing system for performing multiple functions in parallel time.

Typically, multiple users on a network tend to share peripheral devices over the network. Consequently, devices have been developed which combine functions previously handled by a dedicated device. These multifunction peripheral devices, which were developed, include a plurality of functions and act as peripheral equipment for computers. These multifunction peripherals combine printing, scanning, faxing and other functions into a single low cost addressable device. Examples of such multifunction peripheral devices include a facsimile device that has a printing function, or a scanning device that has a printing function.

A problem with these multifunctional peripheral devices occurs when multiple users attempt to access the same device simultaneously. For example, two users may try to initiate a print job from their local personal computers to the same network peripheral. Or, a single user attempts to send multiple jobs to the same device simultaneously. For example, a user may attempt to scan a document, and then initiate a print job. Scan jobs generate considerable data which may substantially delay printing by any device relying on the same peripheral for its printing service.

Generally, communication operations between the computer and the multifunction peripheral device are performed by printer driver and scanner driver programs activated by the computer and a data communications program executed by the multifunction peripheral device. The aforementioned operations can be executed when a user issued commands and settings based on instructions displayed in the display of the computer. However, in these aforementioned systems, communication operations between the respective driver programs of the computer and the data communications program of the multifunction peripheral device can be performed for only one driver program at any time. In this way, the above-described operations cannot be executed in parallel.

That is, in conventional systems, when the multifunction peripheral device is being used as a printer by the computer whose printer driver program is sending print data to the multifunction peripheral device, the scanner driver program of the computer will not be able to perform data communication operations with the scanner unit of the computer when it is performing the printing operation. Similarly, the multifunction scanner data cannot perform scanner transmission to external scanner devices while it is performing the printing operation.

Thus the need exists for a multifunction peripheral that can perform multiple functions simultaneously.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a multifunction peripheral comprising a shared memory for communicating with a plurality of clients. A channel multiplexer selects data from the memory for forwarding to a logical device selector which selects the appropriate peripheral and routes the data to the peripheral. When the peripheral has data for the client, the data is routed through the logical device selector to a channel demultiplexer which then stores the data in the shared memory wherein the client retrieves the data. The multifunction peripheral comprises at least two clients selected from the group consisting of a print client, a scan client, a panel client, a fax client, a copy client, and a device maintenance client. In a preferred embodiment, the logical device selector comprises a SCSI emulator and a PCI bridge that is connected with each peripheral's engine, which select which peripheral data is sent to or received from. Communications between the plurality of clients and the shared memory may be coordinated on a single channel, or each client may have a separate channel.

One embodiment of the present invention is a method for routing data from one of the plurality of clients to one of the plurality of peripherals. The steps comprise routing data from the plurality of clients to a shared memory pool; selecting a selected data from a one of the plurality of clients from the memory pool and routing the selected data to a logical device selector; the logical device selector selecting a destination peripheral from the plurality of peripherals; and routing the selected data from the via the logical device selector to the destination peripheral, the destination peripheral being one of the plurality of peripherals. The method may further comprise routing peripheral data from the destination peripheral to the logical device selector; forwarding the peripheral data to the shared memory pool; and retrieving the peripheral data by a destination client from the shared memory pool.

Another embodiment of the present invention is a method for a multifunction peripheral to route data from a plurality of clients to a plurality of peripherals, the steps comprising: receiving first data from a first one of the plurality of clients into a shared memory pool; selecting the first data from the memory pool and routing, preferably via a multiplexing type switching arrangement, the selected data to a logical device selector; selecting a first destination peripheral from the plurality of peripherals by a logical device selector; routing the selected data from the via the logical device selector to the first destination peripheral. The method further comprising generating an interrupt, which stops the routing of the first data to the logical device selector and then causes routing a second data from a second one of the plurality of clients to the shared memory pool; selecting the second data from the memory pool and routing the second data to the logical device selector; selecting a second destination peripheral from the plurality of peripherals; and routing the second selected data via the logical device selector to the selected peripheral. When the interrupt is generated, this may cause the first client to continue sending first data to the shared memory pool until the available memory is filled, or the first client may be notified of the interrupt, causing the first client to stop sending data to the shared memory pool. The method may further comprise waiting until the second data is routed to the second peripheral; receiving first data from a first one of the plurality of clients into a shared memory pool; selecting the first data from the memory pool and routing the selected data to a logical device selector; selecting a first destination peripheral from the plurality of peripherals by a logical device selector; and routing the first data from the via the logical device selector to the first destination peripheral; wherein the transmission of first data continues where it stopped transmitting at the interrupting step.

Still yet another embodiment of the present invention is a system for a multifunction peripheral to route data from a plurality of clients to a plurality of peripherals, comprising: means for receiving first data from a first one of the plurality of clients into a shared memory pool; means for selecting the first data from the memory pool; means for selecting a first destination peripheral from the plurality of peripherals, wherein the selected data is sent from the shared memory pool to the first destination peripheral. The system further comprises means for generating an interrupt, stopping the routing of the first data to the first peripheral, wherein the means for selecting a peripheral selects a second peripheral, and second data from the memory pool is sent to the second peripheral when the interrupt is generated.

In yet still another embodiment of the present invention, there is a method for routing data from a to a plurality of peripherals of a multifunction peripheral, the steps comprising: receiving a first data from a first one of the plurality of peripherals by a logical device selector; forwarding the first data to a demultiplexing type device; routing the first data from the demultiplexing device to a predetermined portion of a shared memory, wherein a first of the plurality of clients retrieves the first data; generating an interrupt, the interrupt stopping the receiving of the first data by the logical device selector; receiving a second data from a second one of the plurality of peripherals by the logical device selector; forwarding the second data to the demultiplexing type device; and routing the second data from the demultiplexing device to a second predetermined portion of the shared memory, wherein a second of the plurality of clients retrieves the second data. The method may further comprise waiting until the second data is completed and again receiving the first data from the first one of the plurality of peripherals by the logical device selector; forwarding the message to a demultiplexing type device; and routing the message from the demultiplexing device to a predetermined portion of a shared memory, wherein a first of the plurality of clients retrieves the first data, wherein transmission of the first data continues where the first data stopped transmitting at the interrupting step.

In yet still another embodiment of the present invention, there is a system for routing data from a to a plurality of peripherals of a multifunction peripheral to a plurality of clients, comprising means for receiving data from a plurality of peripherals; means for forwarding data to a demultiplexing type device, wherein the demultiplexing type device sends the data to a predetermined portion of a shared memory, wherein a first data is received by the receiving means and routed to a first predetermined portion of memory, and a first of the plurality of clients retrieves the first data. The system further comprises means for generating an interrupt, the interrupt stopping the receiving of the first data, wherein the receiving means is suitably adapted to switch to receive a second data from a second of the plurality of peripherals and the demultiplexing means suitably adapted to send the data to a second predetermined portion of memory, wherein a second of the plurality of clients retrieves the second data.

It is contemplated that the aforementioned systems and methods may be implemented in software, hardware, or a combination thereof.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

This the drawings:

FIG. 2 is a block diagram illustrating the steps used to route data from a client to a peripheral; and FIG. 3 is a block diagram illustrating the steps used to route data from a peripheral to a client.

DETAILED DESCRIPTION OF INVENTION

Figure 1:
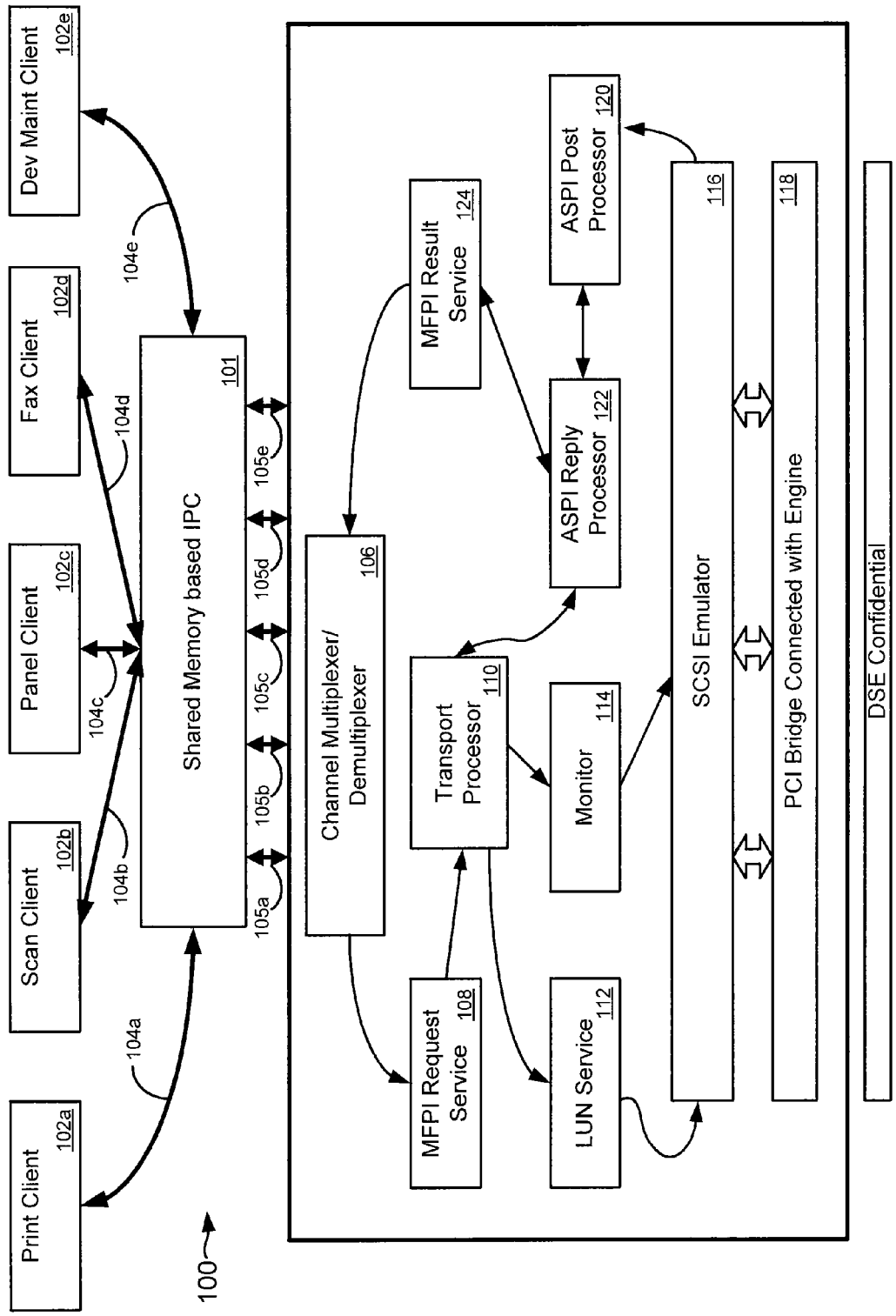
FIG. 1 is a block diagram of the preferred embodiment of the system of the present invention.

Throughout this description, the preferred embodiment and examples shown should be considered as exemplars, rather than limitations, of the present invention.

The present invention is directed to a system and methods for performing multiple functions in parallel time by a multifunction peripheral (MFP). As is well understood in the art, a multifunction peripheral is comprised of at least two peripherals which include, but are not limited to a printer, scanner fax, and copier. As will be understood in the disclosure that follows, the present invention enables more than one of the peripherals to be operated simultaneously.

Referring now to the drawings, and in particular FIG. 1, there is shown a block diagram of the system, generally designated 100, of the preferred embodiment of the present invention. The multifunction peripheral comprises a shared memory inter process controller (IPC) that uses a shared memory pool 101 which is connected between a plurality of clients and a channel multiplexer/demultiplexer 106. In FIG. 1 there is shown a Print Client 102*a*, Scan Client 102*b*, Panel Client 102*c*, Fax Client 102*d*, and a Device Maintenance Client 102*e*. Each of the clients are shown in FIG. 1 as having their own communications channel 104*a*, 104*b*, 104*c*, 104*d* and 104*e* respectively. However, it is also contemplated that the clients may also use a shared communications channel. The shared memory is preferably divided into segments wherein each client is assigned a memory segment, enabling each client to send data to the shared memory separately and without interference from any of the other clients.

Between the shared memory 101 and the channel multiplexer/demultiplexer there is shown separate communication channels 104*a*, 104*b*, 104*c*, 104*d* and 104*e*. These communications channels are assigned to each of the clients 102a, 102b, 102c, 102d and 102e respectively. The When data is going from a client to a peripheral, the channel multiplexer/demultiplexer 106 acts as a multiplexer and selects a communication channel from the shared memory 101. When data is being sent from a peripheral to a client, the channel multiplexer/demultiplexer acts as a demultiplexer, receiving data from the Multifunction Peripheral Interface (MFPI) Result Service 124 and selecting the appropriate one of the communication channels 105a, 105b, 105c, 105d or 105e to deliver the data to the shared memory 101 and subsequently to the appropriate client.

The shared memory 101 may be further divided into segments (not shown) for sending data to the peripheral and for data received from the peripheral. For example, when sending a fax, the data is routed from the fax client 102d to the fax engine (not shown) whereas when a fax is being received the data is routed in the opposite direction. Similarly, when data is sent to a printer engine (not shown) the print commands, text, and data are sent from the printer client 102a, but when the printer needs servicing, such as being out of paper, it needs a means for communicating with the client 102a. Providing a portion of memory dedicated to messages from the peripheral to the client in the shared memory 101 reduces the risk of data collisions and allows the peripheral to check for messages as needed. Each client may use a timer, interrupt or other means well known in the art to check for messages from the peripheral.

The Multifunction Peripheral Interface (MFPI) Request Service 108 receives the data from the channel multiplexer/demultiplexer 106. The data is then forwarded to the transport processor 110. The Transport processor 110 handles the SCSI level communication between the Engine (not shown) and the controller (not shown). The controller is connected with the engine via the PCI Bridge 118. At the controller's start up time, it initiates a SCSI (emulated) level initialization, which causes the MFP to perform initialization of the SCSI (emulated) and related components in it. Once SCSI communication is established between the Engine and the Controller, Transport Services processes a request control block (CB) that usually contains SEND and GET request.

While MFPI Request Service 108 Services is responsible for generating MFP Language based request command, the Transport Processor 110 Services is handling what is needed to move the data to the appropriate subsystem of the other side PCI Bridge 118.

Send Data Operation
1. Break data to into some chunk if the data is bigger than the maximum size specified for one packet.
2. Add MFP header.
3. Call APSI emulating method to send the data.
4. Wait for ASPI call the callback function. When the callback function is called, Transport Services proceed to the next operation, which may be GET.

Get Data Operation
1. Call ASPI emulating method to get data from the specified LUN.
2. Wait for ASPI call the callback function.
3. When the callback function is called, data is copied by ASPI in the temporary buffer that Transport Services allocated before the ASPI function call.
4. Read the MFP header of the data in the temporary buffer and check the reference packet number in the header to determine which CB is expecting the data.
5. Finding the CB, copy the data to the input buffer of the CB.
6. Return the CB back to MFPI Result 124 Services.

The Transport Processor 110 checks both SCSI error and packet protocol level error. When detecting an error, it may retry the operation several times before returning the CB with error status.

The Monitor 114 and the Logical Unit Number (LUN) Service 112 are coupled to the Transport Processor 110. The Monitor 114 is just an auxiliary service of Transport Processor 114 to monitor the connection between Engine and Controller. The LUN Service 112 determines the appropriate SCSI device number of the destination peripheral. The LUN Service 112 and Monitor 114 are both coupled to the SCSI Emulator 116. The SCSI Emulator 116 is operably coupled to the PCI Bridge 118, emulates a SCSI interface and routes the data via the PCI Bridge 118 to the appropriate peripheral based on the LUN number received. In a preferred embodiment, SCSI LUN 0-7 are used for messages from a client to the peripheral, and LUN 8-15 are used for messages from a peripheral to a client; however, other LUN assignments may also be used.

Messages may also be received from a peripheral via the PCI Bridge 118 and through the SCSI emulator 116 routed to the appropriate client. The Advanced SCSI Programming Interface (ASPI) Port Processor 120 is connected to the SCSI emulator 116. The ASPI post processor 120 is a callback method provided by Transport Processor 110 to the SCSI emulator 116. Whenever the SCSI emulator 116 receives a response from the Engine via the PCI Bridge 118 for a controller request, it would call ASPI Post Processor 120 to handle the response. It then further queues the response to the ASPI Reply processor 122 to handle the response. This is done to ensure that callback method does not block the SCSI service for long time. The APSI Reply Processor 122 is a service that determines the type and status of the response. Based upon Get or Set request response, it initiates appropriate actions either provide response to MFPI Result Service 124 or generate another request for Transport Processor. 110. The MFPI Result Service 124 forwards messages it receives to the Channel Multiplexer/Demultiplexer 106. When the Channel Multiplexer/Demultiplexer 106 receives a message from the MFPI Result Service 124, the Channel Multiplexer Multiplexer/Demultiplexer 106 acts as a Demultiplexer and selects the appropriate communication channel 105a, 105b, 105c, 105d or 105e to route the message to the shared memory 101.

Referring now to FIG. 2 there is shown a block diagram of a method 200 used by the present invention for communicating from a client to a peripheral. A client, either 102a, 102b, 102c, 102d or 102e at step 202 generates data (not shown) for the peripheral. The data is then sent from the client to the shared memory 101 as shown in step 204. The Channel Multiplexer/Demultiplexer 106 acting as a multiplexer in this process, then retrieves the data from the shared memory as shown in step 206. The destination of the data is then determined as shown in step 208. Typically step 208 is performed by the MFPI Request Service 110. At step 210 the appropriate peripheral is selected using the SCSI Logical Emulation, wherein the LUN Service 112 selects the appropriate SCSI unit number for the peripheral. Finally as shown in step 212 the data is sent via the PCI Bridge 118 to the peripheral (not shown).

Referring now to FIG. 3, there is shown a method 300 used by the present invention for forwarding data (not shown) from a peripheral to the appropriate client. the process begins at step 302 when the peripheral generates data for a client. At step 304 the data is sent via the PCI Bus to the PCI Bridge 118 and SCI Emulator 116. The ASPI Post Processor 120, ASPI Reply Processor and MFPI Result Service 124 determine the appropriate client based on the SCSI unit number and forward the data to the Channel Multiplexer/Demultiplexer 106 which in this process is acting as a Demultiplexer as shown in step 306. The Channel Multiplexer/Demultiplexer 106 then routes the message over the appropriate communication channel 104a, 104b, 104c, 104d or 104e to the shared memory 101 as shown in step 308. At step 310 the data is retrieved by the client.

Through the use of interrupts, the system of the present invention can be used to run multiple peripherals in parallel. Each client may be designated an area in the shared memory 101 so that when one client is communicating with a peripheral, other clients may continue to send data to the shared memory 101. If only one communication channel is used between the clients 102a, 102b, 102c, 102d and 102e and the shared memory 101, then one client may read/write to the memory 101 while the shared memory 101 is being accessed by the Channel Multiplexer/Demultiplexer 106. However it is preferred that each client have its own separate communication channel as shown in FIG. 1.

The LUN Service 112, Logical SCSI emulator 116 and the PCI Bridge 118 act as a Logical Device Selector for selecting the appropriate peripheral for the client sending the message being retrieved by the Channel Multiplexer/Demultiplexer 106. This may be done by operably coupling these devices to the Channel Multiplexer/Demultiplexer 106 or by using a protocol wherein the header or other portion of a data packet denote the appropriate peripheral.

For example, a user may be sending a print job to the MFP's printer via the print client 102a. The data is sent from the print client 102a via channel 104a to the shared memory 101. The Channel Multiplexer/demultiplexer 106 retrieves the print data via channel 105a and routes it to the appropriate peripheral. The SCSI emulator selects the appropriate logical unit for the printer the print data is sent via the PCI Bridge 118 to the printer's engine (not shown). If a second user needs to use the copier via the panel client 102c or the panel client 102c has other higher priority traffic, the panel client 102c would generate an interrupt. This would cause the Channel Multiplexer/demultiplexer 106 to retrieve from the the shared memory 101 the data from the panel client 102c. This data is then routed via the SCSI emulator 116 and PCI Bridge 118 to the copier's engine. When the copy job is completed, the SCSI Emulator 116 and PCI Bridge 118 resume routing data to the printer engine (not shown) when the Channel Multiplexer/demultiplexer 106 resumes retrieving the print data from the shared memory 101. If the shared memory is divided into segments, then the printer client 102a may continue sending data to the shared memory 101 while the Channel Multiplexer/demultiplexer 106 is servicing the panel client 102c.

By a similar process data may be sent from a peripheral to a client. When a peripheral has data, it can generate an interrupt. The SCSI Emulator 116 and PCI Bridge 118, would service the peripheral and the Channel Multiplexer/demultiplexer 106 would route the data from the peripheral to the shared memory 101. Upon completion of delivery of the message to the shared memory 101, the Channel Multiplexer/demultiplexer 106, and SCSI Emulator 116 and PCI Bridge 118 resume to handling whatever traffic they were handling prior to receiving the interrupt.

While the above examples show switching for data going in one direction, that is either from client to peripheral or peripheral to client, the present invention may also work in two directions. For example, if data is being routed from a client to a peripheral and a peripheral needs to send data to the client, or another peripheral needs to send data to another client, then by generating an interrupt, the Channel Multiplexer/demultiplexer 106 and SCSI Emulator 116 ad PCI Bridge 118 may be switched such that the direction of data flow is from a peripheral to a client.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A multifunction peripheral comprising:
 a segmented, shared memory in mutually independent and concurrent bi-directional data communication with each of a plurality of document processing functions, the data including electronic document data and status data reflective of document processing device operation;
 an independent data path between each document processing function and a corresponding data segment of the shared memory associated therewith;
 a multiplexer/demultiplexer selectively communicating data between an associated controller and a selected data segment of the shared memory; and
 a logical device selector associated with the controller alternately selecting a peripheral from a plurality of peripherals;
 wherein each of the plurality of document processing functions independently communicates data with its corresponding data segment of shared memory, and the multiplexer and logical device selector are operable to route the data from a data segment of the shared memory associated with each document processing device to the controller in accordance with an output of the logical device selector; and
 wherein the logical device selector is operable to receive peripheral data from the selected peripheral, the logical device selector and the demultiplexer routing the peripheral data to the shared memory wherein the selected peripheral retrieves the data from the shared memory.

2. The multifunction peripheral as in claim 1 wherein the plurality of document processing functions are at least two document processing functions selected from the group consisting of a print client, a scan client, a panel client, a fax client, a copy client, and a device maintenance client.

3. The multifunction peripheral as in claim 1 wherein the shared memory is comprised of a plurality of segments, each segment associated with a one of the plurality of document processing functions.

4. The multifunction peripheral as in claim 1 wherein the demultiplexer further comprises receiving data from the logical device selector and routing the data to the shared memory.

5. The multifunction peripheral as in claim 1 further comprising a PCI bridge between the logical device selector and the selected peripheral.

6. The multifunction peripheral as in claim 1 wherein the logical device selector is a SCSI emulator.

7. A multifunction peripheral comprising:
 a segmented, shared memory in mutually independent and concurrent bi-directional data communication to each of a plurality of document processing functions, wherein each document processing function has an individual independent data path and a corresponding data segment of the shared memory associated therewith;

a multiplexer/demultiplexer receiving inputs from the shared memory and outputting data from the shared memory to an associated controller; and a logical device selector associated with the controller alternately selecting a peripheral from a plurality of peripherals;

wherein each of the plurality of document processing functions are configured to simultaneously communicate with the its corresponding data segment of shared memory, and the multiplexer and logical device selector are operable to route data from the shared memory to an appropriate peripheral; and wherein the logical device selector is operable to receive peripheral data from the selected peripheral, the logical device selector and the demultiplexer routing the peripheral data to the shared memory wherein the selected peripheral retrieves the data from the shared memory.

8. The multifunction peripheral as in claim 7 wherein the plurality of document processing functions are at least two document processing functions selected from the group consisting of a print client, a scan client, a panel client, a fax client, a copy client, and a device maintenance client.

9. The multifunction peripheral as in claim 7 wherein the shared memory is comprised of a plurality of segments, each segment associated with a one of the plurality of document processing functions.

10. The multifunction peripheral as in claim 7 wherein the demultiplexer further comprises receiving data from the logical device selector and routing the data to the shared memory.

11. The multifunction peripheral as in claim 7 further comprising a PCI bridge between the logical device selector and to the selected peripheral.

12. The multifunction peripheral as in claim 7 wherein the logical device selector is a SCSI emulator.

* * * * *